United States Patent [19]
Cerroni

[11] 3,891,105
[45] June 24, 1975

[54] SYSTEM FOR RECOVERING AND TREATING USEFUL ELEMENTS FROM WASTE MATERIALS

[76] Inventor: Manlio Cerroni, Via Bruxelles 53, Rome, Italy

[22] Filed: May 9, 1973

[21] Appl. No.: 358,516

[30] Foreign Application Priority Data
Feb. 22, 1973 Italy .................................. 48411/73
Apr. 20, 1973 Italy .................................. 49595/73

[52] U.S. Cl. .................... 214/305; 83/597; 225/104
[51] Int. Cl. .............................................. B65g 65/04
[58] Field of Search ...... 214/305; 225/97, 104, 105; 83/597, 599, 610

[56] References Cited
UNITED STATES PATENTS
| | | | |
|---|---|---|---|
| 3,596,842 | 8/1971 | Barber | 214/305 |
| 3,719,314 | 3/1973 | Cox | 225/104 |
| 3,720,359 | 3/1973 | Cox | 225/104 |

*Primary Examiner*—Robert J. Spar
*Assistant Examiner*—Lawrence J. Orfsky
*Attorney, Agent, or Firm*—Toren, McGeady and Stanger

[57] ABSTRACT

A process and equipment able to lacerate bags of plastic and/or paper containing solid urban wastes, in which a spike and a knife, driven by one first mover, act together causing continuous lacerations and not cutting in the bags and therefore the exposition of the materials within the bags.

The paper present in the bags or coming from other sources is, according to the present invention, dealt with in such a way to be turned into paper-pulp, whereas the other materials, also according the present invention, are recovered for obtaining a base-product for stock-feed.

The invention provides also the devices and the plants for obtaining the previously quoted products.

4 Claims, 13 Drawing Figures

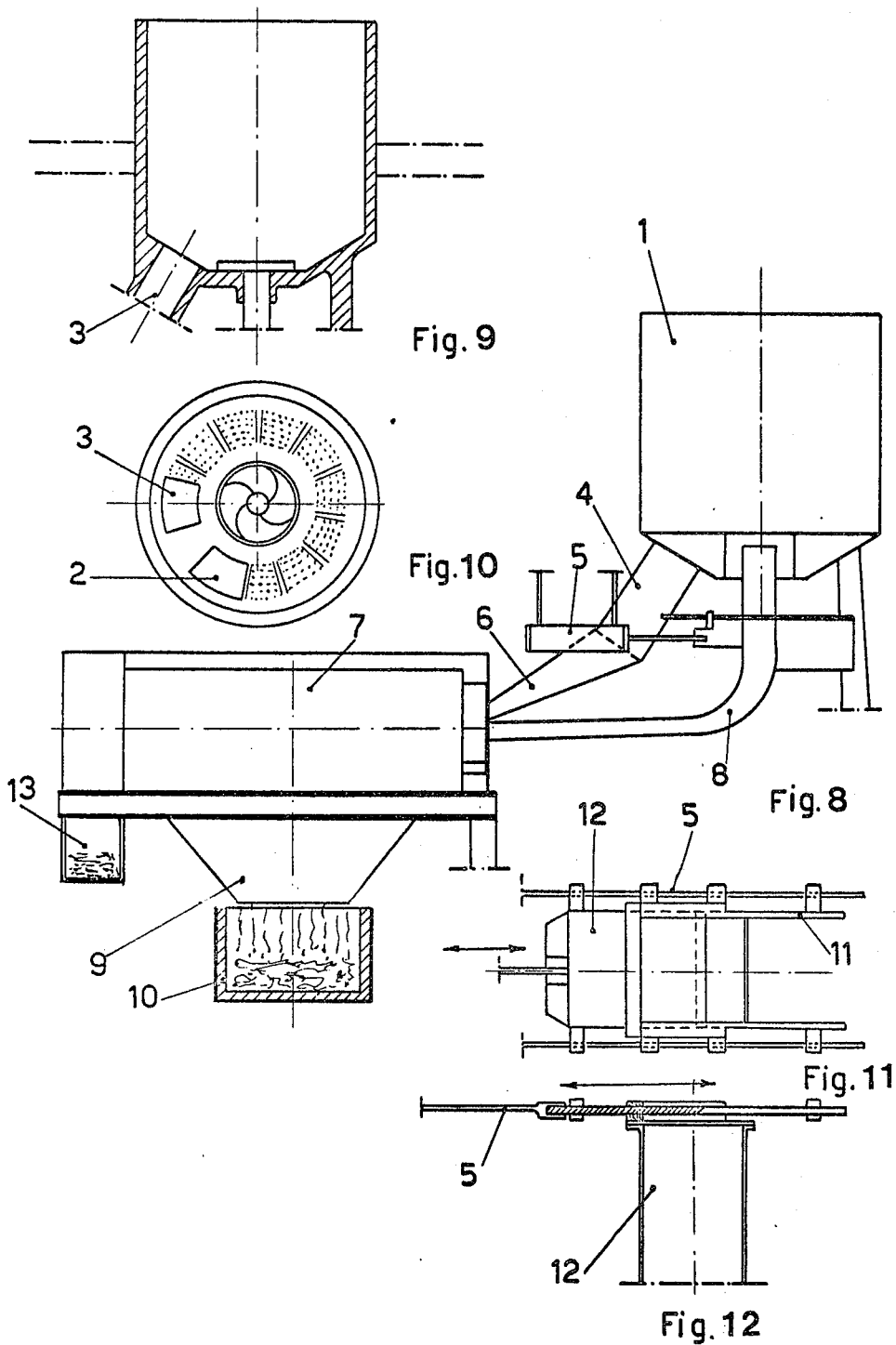

SYSTEM FOR RECOVERING AND TREATING USEFUL ELEMENTS FROM WASTE MATERIALS

It is well-known that in solid urban wastes it is possible to find many materials, which, if suitably recovered and processed, can provide material of an interesting commercial value. Therefore, it is important, merely exemplary, to recover waste paper and produce from it paper-pulp, or to process suitable products for obtaining from them stockfeed, or stockfeed-supports, or also other products.

It is also known that the plants for the recovery of useful products from solid urban wastes need to dispose of a loose material, from which it is therefore possible to separate the different components at subsequent times.

Furthermore, there is also known the actual general trend of collecting the wastes within non-return bags, more particularly in plastic-bags, and in some cases, also in paper-bags or in bags of paper coupled with plastic sheets.

From the foregoing statements therefore it is possible to point out the need of having the possibility of opening or preferably breaking reliably and speedily the bags in such a way as to feed the above mentioned recovery-plants with loose material already ready for processing.

In the course of years it was observed, however that in urban solid wastes there is present more and more matter, which can not be regarded as paper and which at the same time are waterproof.

In other words, all the last named matter originate from all the debris of plastic materials used for packaging of any kind. Indeed, such plastic materials debris can not be used for producing paper-pulp and is a hindrance in the mechanical sorting of the waste-materials. Therefore, until the present separation between paper and plastic materials had to be done manually and, of course, this manual labor weighs heavily on the processing-costs, and furthermore not being allowable from an hygienic point of view.

It is also known that in solid urban wastes there are present notewhorty quantities of paper, that, until now, are not recovered in a convenient way, as a consequence of their incomplete separation from the foreign bodies, to which the paper is united some times in a very tenacious way, to foreign bodies having a specific weight greater, smaller or equal to the one of the paper.

Indeed in hydrodynamic kneaders, as the ones which are usually used, the paper coming-out from the solid urban wastes was fed to the kneaders, only after a manual sorting, with a great use of labour working under very bad conditions from a hygienic point of view. Furthermore, this sorting allows the recovery of a portion only of all the paper which is present in the wastes.

In the course of the improvement of the recovery of solid urban wastes, the mechanical sorting of this paper using special equipment, which, however, feed to the kneaders not only paper, but also foreign materials having a specific weight greater, smaller or equal to the one of the paper. Of course, these materials are an hindrance to the operation of the hydrodynamic kneaders originating a poor paper pulp and at the same time causing entanglements originating in the kneaders, usually called plaits of not pulp-reducible materials. These last named products compel stopping and to the emptying rather frequently of the kneaders for the purpose of their removal and, of course, all it involves a sizeable reduction of the output of the plant and, in some extreme cases, also the stopping of the plant.

On the other hand, it is also known that for the feeding of animals on farms many kinds of stockfeeds are used and that many of these stockfeeds are obtained from products removed from the more different sources, not excluding the one of the urban wastes, conveniently elaborated.

It is also well known that urban wastes, in connection with their source, contain a certain amount of products not-convenient for use as stockfeeds, but until now, these not-convenient products were not surely separated in the requested measure from the basic product to be used for the production of stockfeeds. The last materials which are not allowable as foodstuffs, are materials having a specific weight greater, equal or smaller than the one of the products allowable as foodstuffs.

Therefore, an object of the present invention is to provide a process for tearing the bags of plastic materials and/or the ones of paper, containing any kind of material and more particularly solid urban wastes and furthermore a device that allows the implementation of the process.

According to the process, it is the object of the present invention, that the bags are attacked by a mechanical device comprising many levers, which with their alternate movement, this last movement reproducing vaguely the movement of scissors having spaced and not aderent blades, cause continuous lacerations (tears and not cuts) in the bags or that the materials that are contained in the bags are exposed. The mechanical device, to be used for carrying out the aforementioned process, comprises a series of spikes that are hinged on a fixed axis and provided with a periodical movement of lifting and lowering of the free ends of the same and of a series of knifes, that are articulated in a direction and that are fixed to an axis having a rotating motion in the two directions within an arc of about 90°. These two movements are in a perfect synchronism, being operated by only a device, and preferably by an alternatively driven piston, which may be hydraulic, or pneumatic, and having a pressure limiting device (pressure switch), that intervenes each time the knives meet with a too great resistance automatically reversing the rotative movement.

The connection between the movement of the knives which are operated directly from the piston, and the spikes is obtained through a constraint element such as a rope or a chain, which on the one hand allows that the aforementioned spikes, which hook the bags, are stopped in their down travel to the height derived by the compactness and the nature of the materials within the bags, and on the other hand the aforementioned constraint element acts in such a way that when the travelling knife skims the feeding band and meets with the spike in its lowered position the two elements act as a scissors.

Indeed, both the spikes and the knives travel at an adjustable distance from the feeding band, with the distance being a function of the size of the bags, of the nature of the materials within and of the strength of the bags.

The rim speed, at which the knives travel in their operations arc, is usually greater or equal to the translation speed of the feeding band in such a way as to avoid the slowing of the bags-speed. Furthermore, the operation's arc is adjustable in its angle, being at the same time also adjustable to the speed of its covering. Moreover, the knives are released in a direction in such a way as to avoid, in their reverse movement, the entraining of the materials contained in the bags.

Another object of the present invention is to provide a plant for the continuous production of paper-pulp from the urban solid wastes, in which the hindrances previously mentioned are avoided.

According to the present invention the waste paper coming out from a sorting plant, i.e., the paper carrying with it materials having a specific weight different from the one of the paper, in any case foreign matter, which are, whether joined with or also adherent to the paper, is fed to an hydrodynamic kneader already known. From this last named kneader, the obtained paper-pulp is drawn in connection with an already known system. Now, independently from the drawing system of the paper-pulp to be subsequently refined, there is provided downstream of the hydrodynamic kneader a valve, which is periodically opened and closed, through which are drawn out from the hydrodynamic kneader paper-pulp and different materials, that are not susceptible of deterioration and mushing for the action of the water.

Both the paper-pulp drawn out of the plant, in a continuous way, according to the normally employed system and the material that was drawn out through the aforementioned valve, are fed, according the present invention, to a sorting apparatus, which separates the paper-pulp rich in water from the other materials, more in particular from the ones not susceptible to be affected by the action of the water and having a specific weight equal or lower that the one of the paper, these last materials being carried out of the plant on special conveyors. Vice versa, the pulp coming out from the plant of the present invention through the revolving apparatus, is collected in tanks or vats, acting as plenum chambers for the following section of the plant, that is provided for the following treatment of the obtained paper-pulp. Indeed, this coarse paper-pulp must be subjected to a treatment for the separation of foreign materials, as metallic elements, stones, sand, etc. In the plant, there is also provided for the thickening of the purified paper-pulp coming from the plant upstream to such a value of the water content to allow its transportation and the following use in the paper mills.

It is another object of the present invention to provide a process having the purpose of obtaining a base-product to be used as stockfeeds. According to the process the material coming out from the base-product and still mixed with not edible materials, is subjected to a washing treatment and afterwards to a sedimentation. Following this last operation the so obtained product is subjected to a screening and afterwards press.

The so obtained product, after sterilization, is subjected to a treatment in driers and in cyclones. Following now this treatments, according to the present invention, the product coming out from the last cyclone, where the more lighter inerts are separated, which are carried to the waste, whereas the edible product is feed to the following treatment plant. It is to be observed specifically that the light inerts are separable with difficulty from the remaining edible material the separation between the two products is made, following the process through a special sorting device through which only the edible materials previously reduced to powder can pass, as the light inerts, in consequence of the conditions of temperature and pressure established in the process, are not reduced in powder and therefore can be separated from the edible materials and removed from the processing cycle of the edible products.

These and other objects of the present invention will come out more clearly from the following description to be considered in accordance with the enclosed drawings, in which:

FIG. 1 shows an axonometric view of the device for the tearing of the bags in a preferred embodiment;

FIGS. from 2 until 7 show diagrammatically the kinematic motion of the device in the FIG. 1 in its different operating conditions;

FIG. 8 shows a diagram of the plant according the invention, for the continuous production of paper-pulp;

FIGS. 9 and 10 show diagrammatically in vertical section and from the top, an hydrodynamic kneader, according the invention;

FIGS. 11 and 12 show in side view and in plan view a type of valve as preferably is employed in the plant according the invention.

Figure 1:
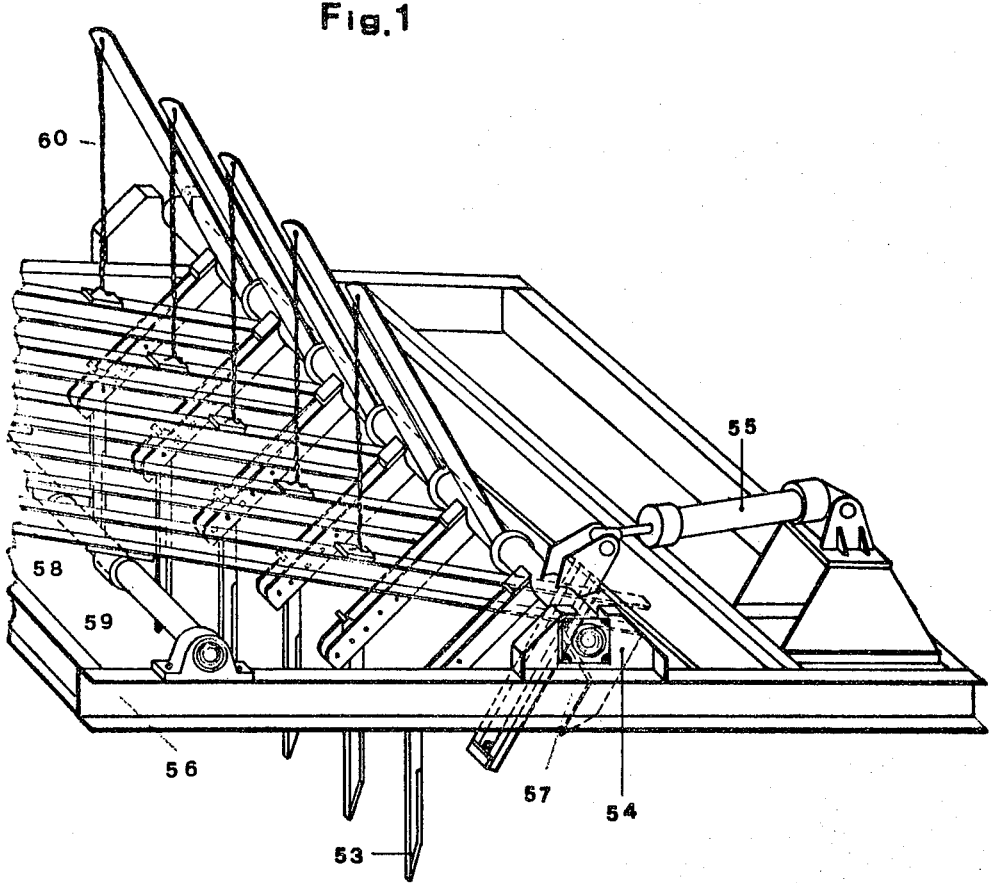

As for this drawing and more particularly from FIGS. 1 to 7, the device for the implementation of the present invention comprises a frame 56 on which are applied a piston 55 and a series of spikes 54 and knives 53. The knives 53 are applied on a shaft 57, that is carried by suitable cross-bars 58 hinged on an axis 59 acting as a pin; on the above-mentioned cross-bars are fixed the spikes 54.

Figure 2:
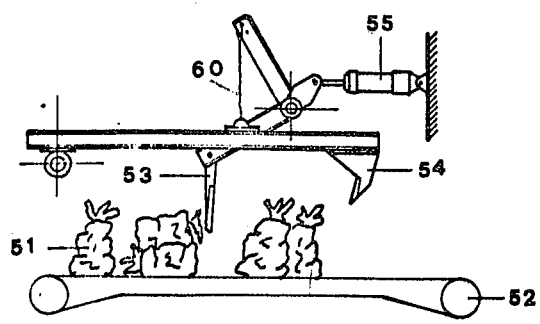
Figure 3:
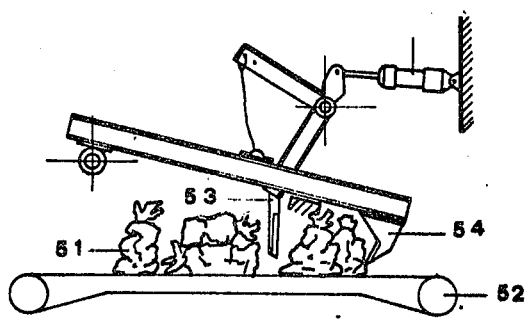

As it is possible to observe better diagrammatically in the FIGS. 2 to 7, the bags 51 filled with materials are travelling on the conveying band 52 until they meet the device in its open position (FIG. 2).

In this position the knife 53 and the spike 54 are entirely lifted and the piston 55 is in its quite withdrawn or retracted position. In such a condition, the bags are travelling forward on the conveying band 52 undisturbed. In the phase illustrated in the FIG. 3, the knife 53 begins to lower, as the piston 55 begins its extension, therefore all the unit is lowered and also the spike 54 is lowered with the consequence that it hooks the bag which is travelling under the same, stopping the said bag in this position.

Figure 4:
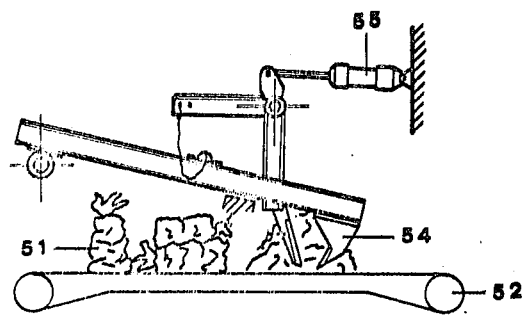

As a consequence of the extension of the piston 55, all the unit goes on in its lowering until it has reached the position shown in the FIG. 4, a position in which the knife goes near to the spike originating the tearing, whereas the spike remains stationary. As it is possible to observe in the figure the restraint device 60 between the cross-bar 58 carrying the spike 54 and the lever carrying the knife 53 rotates as a consequence of the extension of the piston 55, whereas the spike 54 remains in the position already attained this last being the limiting one. As aforementioned, whereas the knife 53 is approaching the bag and starts the laceration of the same, the spike 54 remains stationary in consequence of its own weight in the attained position.

Figure 5:
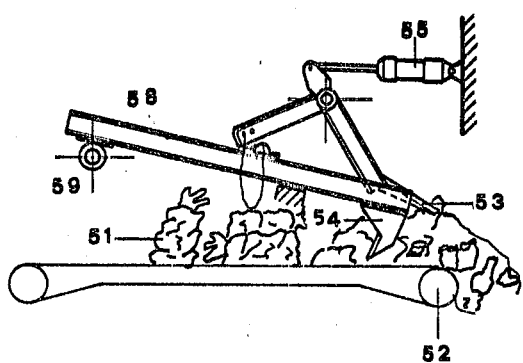

As a consequence of the going on with the extension of the piston 55 the knife 53 is put forward, as it is possible to observe in the FIG. 5, and therefore ends its tearing action, whereas the spike 54, which as we have previously observed, presses with its own weight, can be lifted as a consequence of the action of the knife, when between the knife and the spike is wedged a body particularly tough, or an excess of material. This last freedom of movement of the tearing device has the purpose of allowing a more sure operation of the above-mentioned device.

Figure 6:
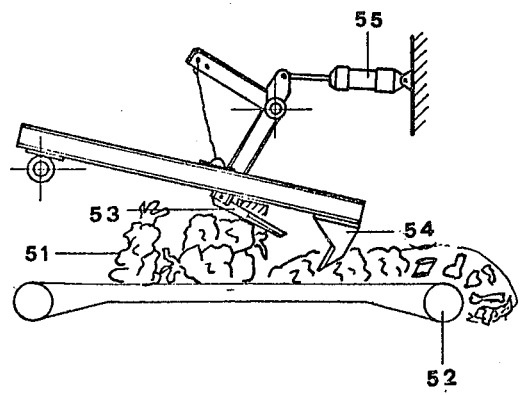
Figure 7:
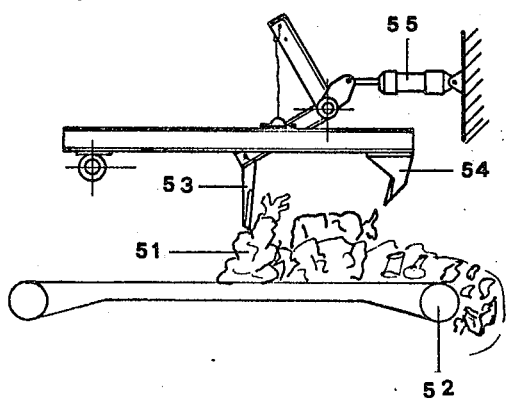

In the phase of the action as shown in the FIG. 6, the knife ends the reversal movement and thank to its unidirectional articulation, the said knife is self-cleaning and therefore avoids the possibility of bring back some material. The spike 54 remains in its lowered position.

When the knife 53, having the piston 55 withdrawn to its original position, takes again its own position, the spike 54 is lifted as a consequence of the traction exercised on its cross-bar 58 by the constraint device 60 ending in this way the cycle. Of course, the cycle is repeated periodically and disposing of a convenient number of knives and spikes on the feederwidth, the tearing of the bags can be ended only in a time; of course, in particular cases, when only a passage would be not sufficient, it is possible to provide another equipment as the one previously described, always on the same feeder, eventually with parameters (as wheel, action arc, distance, pressure, frequency, etc.) that are adjusted in a different way.

The shown process, in addition to allowing an operation, that until now could not be made following other systems, has also the great merit of not maltreating the materials within the bags, as these last ones are not removed on the feeder and in the same time are not subjected to a cutting operation.

As already said, and making reference to the FIGS. 8 to 12, the recovered paper coming-out from whatever a feeder, is feeded to an hydrodynamic kneader 1, being this last one provided together with a normal safety-valve 2, with an additional opening 3. From the opening 3 starts a pipe-line 4, provided in a convenient place with a valve 5, that, as already said, is controlled periodically. From the valve 5, through a convenient pipe-line-fitting 6, the material is fed to the sorting apparatus. From the other side, through a pipe-line 8, the pulp withdrawn in a continuous way from the kneader 1, following well-known, is fed, at its turn, into the apparatus 7.

The apparatus 7, diagrammatically shown in the FIG. 8, can be provided on its interior side with a perforated skirt through the holes of which pass through the paper-pulp rich in water. Subsequently this paper-pulp goes, through a convenient hopper 9, into storing tanks and basins 10. The materials, which are different from the paper-pulp and having a size that don't allow that they pass through the holes of the skirt are carried to the outlet of the apparatus on a conveyor band 13, or using any other kind of conveyor for passage to a next stocking-place whether for their subsequent treatment, or for their destruction.

As before mentioned, from the kneader 1 is going out a pipe-line 4, 6 that is cut by a valve 5. This valve 5, as represented generically in the FIGS. 11 and 12, is preferably a guillottine-valve composed of a frame 11 within which is travelling a blade 12 controlled through a convenient system, preferably an hydraulic one. The blade 12 has its edge in the side opposed to the one from which is controlled, shaped as a knife in such a way to produce a true cut of the material, that can be between the blade 12 and the aforementioned frame 11 at the moment in which the valve 5 is closed. This solution is particularly important as allowing the real and exact closing of the valve and as allowing also the interceptation of the material, that through the pipe-lines 4 and 6 and the valve 5 reaches the interior of the sorting apparatus 7, in such a way that the recovered paper, contained in the kneader 1, remains in the same for a time sufficient for reaching the foreseen maceration degree.

According to a further feature of the plant, the water already used in the treatment of the recovered paper, is suitably recovered and recycled in the kneader, allowing in this way also a sizeable economy of water and furthermore an ecological safeguard, what is very badly needed at this time.

As previously stated and as apparent to those skilled in this art, the present invention allows the attainment of a paper-pulp under any means quite in conformity with the requirements of the paper-mills, and, at the same time, allows a quick, continuous and complete use of the paper that is present in the solid urban waste.

Figure 13:
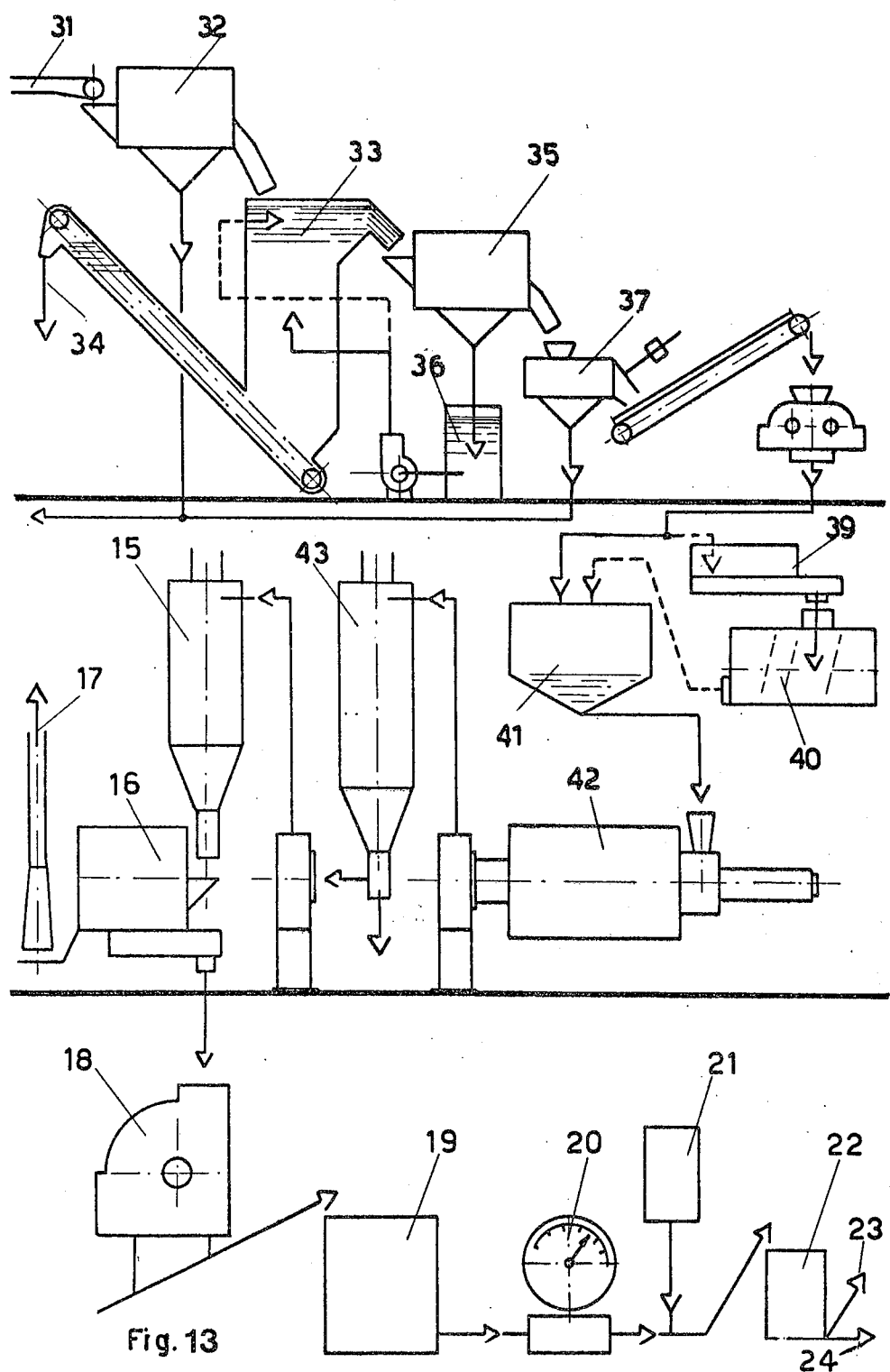
FIG. 13 shows a diagram of a plant for carrying out the process for the production of a base product to be used as stockfeed.

At its turn, in the FIG. 13, is shown a schema of a plant for the production of a base product to be used as stockfeed. In the plant, the material to be worked, coming, for example, from the working of the solid urban waste, is fed through conveying means 31 to a washing screen 32, were the product is subjected to a strong and effective washing having the purpose of removing mould and small inert components. From the washing screen, the material is carried to a sedimentation basin 33, where the heavy inert components (as for example, glass, stones, iron-scrap and different wastes) fall at the bottom and are collected and discharged through the exhaust mouth 34. From the sedimentation basin 33, the light edible products are dragged from the water and routed to a separation screen, where the material having a specific weight only a little greater that the one of the water, are helped in their floating from a tangential rising stream, being the stream originated by the recovery water coming from the weir of the sedimentation basin 33.

The stream can act only in the direction of the fall of the material just under the water surface, in such a way to carry immediately to the weir the components having a specific weight also just a little greater than the one of the water. From the weir of the basin 33, the water and the edible products fall in a screen 35, having the purpose of separating the water from the edible products. The drained water is collected in a basin 36 and through a pump is fed to the sedimentation basin. As it is possible to observe in the Figure, the water coming out from the pump can be letted in the said sedimentation basin 33 from its bottom and/or, as shown by the dashed line, tangentially, just under the surface as previously stated.

The edible products are sent to a press 37, the pressure of which is adjustable, in such a way to eliminate as much water is possible.

Therefore, at the end of its treatment cycle it is possible to have a product free of the greater part of its heavy components and of the greater part of the washing water.

The products following an already known treatment-line, go in a plenum chamber 39 and from this last named device into an autoclave 40 and from this autoclave to a dosing plenum-chamber 41 and furthermore to a dryer 42, which eliminates the remaining water completely drying the product and at the same time providing to its improvement and sterilization. At this moment, we have an edible product, carrying always some waste light components. Therefore, the obtained product, after drying and loosening, is fed through the cyclones 43 and 15 to the screen 16 having the purpose of separating the edible material from the aforementioned light waste-components, which are the last ones sucked through the exhaust mouth 17. In the meantime the edible product is discharged into a mill 18, in which it is subjected to subsequent treatment.

In other words, one of the most important features of the present process is the one that the edible product is subjected to a first treatment in which the heavy products are separated.

The separation of the powder of the edible product from the light inert material, that was not possible to reduce to a powder, is obtained through another screen having very thin holes and preferably under pressure, so that it is possible to obtain a true and efficacious separation of the different components allowing the elimination of the light inerts from the edible product.

As already mentioned, at the exit of the screen 16, for the purpose of separating the inert components, the edible product is fed to a mill and from this last named to a silo 19, from which the product is passed through a scale 20 and an integrator 21 to a silo 22 for the stockfeed and from this last one to the pelleting machine 23 or to the bag-filling machine 24.

The improvements to the processes and to the plants for the recovery and the treatment of useful substances present in solid urban wastes are described and shown only as a not-limitative example. Of course, it is to be understood that the invention is capable of practical variations, as suggested from the technique and the practical application, without departing from the spirit and the scope of the invention, as for the enclosed claims.

What is claimed is:

1. Device for use in the recovery and treatment of useful substances contained in solid urban wastes where the wastes are contained within bags formed of a tearable material, such as plastic, paper, or combination of plastic and paper, comprising means for moving the bags filled with solid urban wastes along a path of travel, a frame located above the path of travel, means for supporting the frame and for moving it into the path of movement of the bags on said moving means, laterally spaced spikes fixedly secured to said frame and arranged to depend from the frame into and across the path of movement of the bags for blocking movement of the bags, and knives dependently and movably supported on said frame for performing a cyclic oscillating movement, said knives arranged in laterally spaced relationship for depending into and across the path of movement of the bags, in each cycle of movement said knives are initially spaced upstream from said spikes relative to the path of travel of the bags and moved toward and past said spikes effecting a tearing action on the bags held by said spikes and exposing the material within the bags, said knives spaced laterally relative to said spikes and effecting a scissors-like action therebetween as they pass said spikes, and then reversing direction and moving in the direction opposite to the movement of the bags on said moving means and through the bags and material therein to the initial position.

2. Device, as set forth in claim 1, wherein said means for supporting and moving said frame comprises a piston, and said means for moving the bags comprises a conveying band.

3. Device, as set forth in claim 2, wherein said frame comprises a plurality of cross-bars extending in the direction of movement of said conveying band, each said cross-bars having one of said spikes fixedly attached thereto and located at the downstream end of said cross-bars relative to the movement of said conveying band, a rotatable shaft supported on and extending transversely of said cross-bars, a plurality of lever means spaced apart on said shaft in its axial direction, each of said lever means supporting one of said knives, restraint means connected between said cross-bars and said lever means and arranged for controlling the lifting of said spikes.

4. Device, as set forth in claim 3, wherein said lever means comprises a first lever secured to and extending radially outwardly from said shaft, one of said knives secured to said first lever at a position spaced outwardly from said shaft, and a second lever secured to and extending radially outwardly from said shaft and spaced angularly about said shaft from said first lever, and said restraint means comprises a plurality of rope-like members each attached to the radially outer end of one of said second levers and to one of said cross-bars at a location spaced upstream relative to the path of movement of said conveying band from the end of said cross-bar at which said knife is located.

* * * * *